United States Patent
Chun et al.

(10) Patent No.: US 10,157,008 B2
(45) Date of Patent: Dec. 18, 2018

(54) SYSTEMS AND METHODS FOR OPTIMIZING MEMORY POWER CONSUMPTION IN A HETEROGENEOUS SYSTEM MEMORY

(71) Applicant: QUALCOMM INCORPORATED, San Diego, CA (US)

(72) Inventors: Dexter Tamio Chun, San Diego, CA (US); Yanru Li, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 58 days.

(21) Appl. No.: 14/699,431

(22) Filed: Apr. 29, 2015

(65) Prior Publication Data

US 2016/0320994 A1 Nov. 3, 2016

(51) Int. Cl.
| | |
|---|---|
| G06F 3/06 | (2006.01) |
| G06F 12/02 | (2006.01) |
| G06F 9/44 | (2018.01) |
| G06F 12/06 | (2006.01) |
| G06F 9/4401 | (2018.01) |

(52) U.S. Cl.
CPC ............ G06F 3/0625 (2013.01); G06F 3/068 (2013.01); G06F 3/0659 (2013.01); G06F 9/4403 (2013.01); G06F 12/0238 (2013.01); G06F 12/0638 (2013.01); G06F 2212/1028 (2013.01); G06F 2212/205 (2013.01); G06F 2212/7204 (2013.01); Y02D 10/13 (2018.01)

(58) Field of Classification Search
CPC .. G06F 3/068; G06F 3/0685; G06F 2212/205; G06F 9/4401; G06F 2213/0038; G06F 9/4403; G06F 12/0238; G06F 12/0638; G06F 11/1417; G06F 2211/1097
See application file for complete search history.

(56) References Cited

U.S. PATENT DOCUMENTS

| | | | | |
|---|---|---|---|---|
| 5,930,827 | A * | 7/1999 | Sturges | G06F 12/023 711/170 |
| 6,442,660 | B1 * | 8/2002 | Henerlau | G06F 9/44573 711/161 |
| 7,685,376 | B2 * | 3/2010 | Zimmer | G06F 12/0638 711/154 |
| 8,929,146 | B1 | 1/2015 | Asnaashari et al. | |

(Continued)

OTHER PUBLICATIONS

International Search Report and Written Opinion—PCT/US2016/024605—ISA/EPO—dated Jul. 4, 2016.

*Primary Examiner* — Ann J Lo
*Assistant Examiner* — Masud K Khan
(74) *Attorney, Agent, or Firm* — Smith Tempel Blaha LLC

(57) ABSTRACT

Systems, methods, and computer programs are disclosed for providing a heterogeneous system memory in a portable communication device. One system comprises a system on chip (SoC) coupled to a nonvolatile random access memory (NVRAM) and a volatile random access memory (VRAM). The SoC comprises an operating system for mapping a heterogeneous system memory comprising the NVRAM and the VRAM. The operating system comprises a memory manager configured to allocate a first portion of the NVRAM as a block device for a swap operation, a second portion of the NVRAM for program code and read-only data, and a third portion of the NVRAM for operating system page tables. The VRAM is allocated for a program heap and a program stack.

21 Claims, 14 Drawing Sheets

(56) References Cited

U.S. PATENT DOCUMENTS

| | | | |
|---|---|---|---|
| 8,938,601 B2 | 1/2015 | Lee et al. | |
| 2011/0302399 A1* | 12/2011 | Dubinsky | G06F 9/4401 |
| | | | 713/2 |
| 2012/0284587 A1 | 11/2012 | Yu et al. | |
| 2013/0339572 A1* | 12/2013 | Fanning | G06F 3/0688 |
| | | | 711/102 |
| 2014/0006692 A1* | 1/2014 | Berntsen | G06F 12/0246 |
| | | | 711/103 |
| 2014/0047251 A1 | 2/2014 | Kottilingal et al. | |
| 2014/0075176 A1* | 3/2014 | Sadasue | G06F 9/4401 |
| | | | 713/2 |
| 2014/0143518 A1 | 5/2014 | Kim et al. | |
| 2014/0208047 A1* | 7/2014 | Vembu | G06F 12/0292 |
| | | | 711/161 |
| 2014/0215177 A1 | 7/2014 | Kim et al. | |
| 2014/0223098 A1 | 8/2014 | Lee et al. | |
| 2014/0281151 A1* | 9/2014 | Yu | G06F 1/30 |
| | | | 711/103 |
| 2014/0297938 A1 | 10/2014 | Puthiyedath et al. | |
| 2016/0140039 A1* | 5/2016 | Sodani | G06F 12/0646 |
| | | | 711/119 |
| 2016/0232057 A1* | 8/2016 | Star | G06F 11/1417 |

\* cited by examiner

| TYPE OF MEMORY REQUEST | ALLOCATE TO DRAM | ALLOCATE TO MRAM |
|---|---|---|
| FORK NEW PROCESS | HEAP, STACK | CODE, TEXT |
| MMU PTE | - | PAGE TABLE |
| BUFFER MALLOC | BUFFER | - |
| O/S FILECACHE PAGE | - | BLOCK |
| O/S SWAP PAGE | - | BLOCK |

| SW MEMORY PARTITION | BASE | SIZE | ALLOWED IMAGE | VALID | BASE | SIZE |
|---|---|---|---|---|---|---|
| KERNEL | 0X80000000 | 0X20000 | | | | |
| DRAM CARVEOUT | 0X80200000 | 40MB | SBL | 0 | | |
| | | | TZ data | 1 | 0X80020000 | 1MB |
| | | | modem data | 1 | 0X80120000 | 40MB |
| | | | ADSP data | 0 | | |
| MRAM CARVEOUT | 0X90000000 | 40MB | shared data | 1 | 0X90000000 | 16KB |
| | | | TZ code | 1 | 0X90000400 | 1MB |
| | | | modem code | 1 | 0X90100400 | 20MB |
| | | | ADSP code | 0 | | |
| SWAP | 0X98000000 | 128MB | NONE | 1 | | |

FIG. 6

| PROGRAM HEADER FLAGS | VALUE | PURPOSE |
| --- | --- | --- |
| PF_X | 1 | THE SEGMENT MAY BE EXECUTED |
| PF_W | 2 | THE SEGMENT MAY BE WRITTEN TO |
| PF_R | 4 | THE SEGMENT MAY BE READ |
| PF_MASKPROC | 0Xf0000000 | RESERVED FOR PROCESSOR-SPECIFIC PURPOSES |

FIG. 8

| USE CASE | SWAP PARTITION (MB) | HLOS READ AREA (MB) | PERIPHERAL IMAGE (MB) |
|---|---|---|---|
| GAME WITH MUSIC | 128 | 88 | 40 |
| STREAMING VIDEO DOWNLOAD | 144 | 72 | 40 |
| VIDEO PLAYBACK MULTIPLE WINDOWS | 160 | 56 | 40 |
| VIDEO RECORDING | 136 | 80 | 40 |

*FIG. 13*

SYSTEMS AND METHODS FOR OPTIMIZING MEMORY POWER CONSUMPTION IN A HETEROGENEOUS SYSTEM MEMORY

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.). The SoC may be coupled to one or more volatile memory devices, such as, dynamic random access memory (DRAM) via high-performance data and control interface(s).

DRAM is a type of volatile memory that stores each bit of data in a separate capacitor within an integrated circuit. The capacitor can be either charged or discharged. These two states are taken to represent the two values of a bit, conventionally called 0 and 1. Because capacitors leak charge, the information eventually fades unless the capacitor charge is refreshed periodically. Because of this refresh requirement, DRAM is referred to as a dynamic memory as opposed to SRAM and other static memory. An advantage of DRAM is its structural simplicity—only one transistor and a capacitor are required per bit—which allows DRAM to reach very high densities. However, as DRAM density and speed requirements continue to increase, memory power consumption continues to a significant problem.

Accordingly, there is a need for improved systems and methods for reducing memory power consumption in systems that incorporate volatile random access memory (VRAM).

SUMMARY OF THE DISCLOSURE

Systems, methods, and computer programs are disclosed for providing a heterogeneous system memory in a portable communication device. An embodiment of a system comprises a system on chip (SoC) coupled to a nonvolatile random access memory (NVRAM) and a volatile random access memory (VRAM). The SoC comprises an operating system for mapping a heterogeneous system memory comprising the NVRAM and the VRAM. The operating system comprises a memory manager configured to allocate a first portion of the NVRAM as a block device for a swap operation, a second portion of the NVRAM for read-only program code and data, and a third portion of the NVRAM for operating system page tables. The VRAM is allocated for a program heap and a program stack.

Another embodiment is method for optimizing memory power consumption in a portable communication device. The method configures a heterogeneous system memory for a system on chip (SoC) on a portable communication device. The heterogeneous system memory comprises non-volatile random access memory (NVRAM) and volatile random access memory (VRAM) coupled to the SoC. A first portion of the NVRAM is allocated as a block device for a swap operation. A second portion of the NVRAM is allocated for read-only program code, and a third portion of the NVRAM is allocated for operating system page tables. The VRAM is allocated for a program heap and a program stack.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 6 is an embodiment of a data structure for storing system memory characteristics of a software memory partition.

FIG. 8 is a table illustrating exemplary program header flags for packaging a program image in the nonvolatile block memory of FIG. 1.

FIG. 13 is a traffic calibration table illustrating exemplary use cases implemented in the method of FIG. 12.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
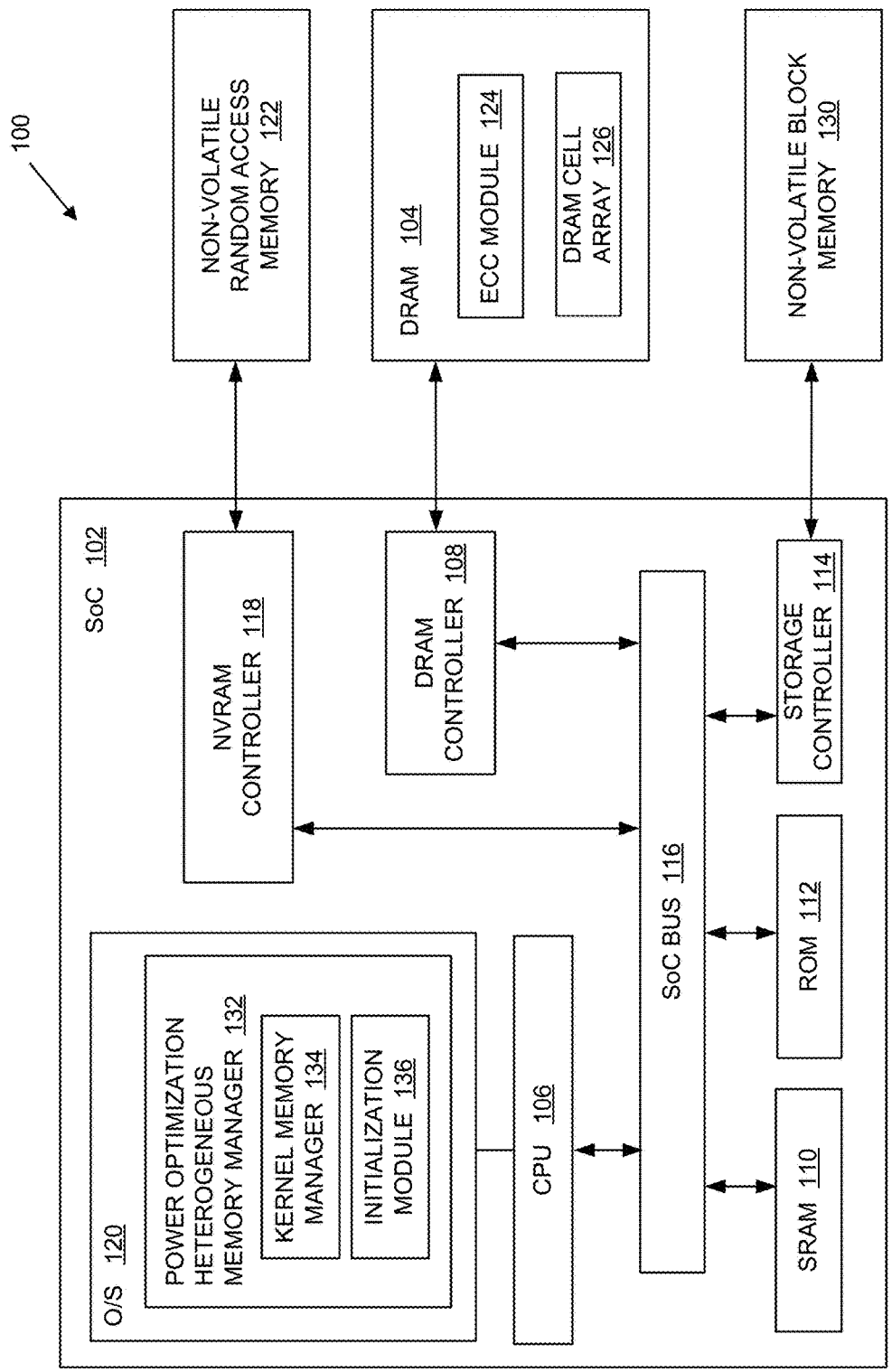
FIG. 1 is a block diagram of an embodiment of a system for optimizing memory power consumption of a heterogeneous system memory.

FIG. 1 illustrates a system 100 comprising a system on chip (SoC) 102 having a heterogeneous system memory comprising a volatile random access memory (VRAM), such as, a dynamic random access memory (DRAM) 104 and a nonvolatile random access memory (NVRAM) 122, each of which are electrically coupled to the SoC 102. The NVRAM 122 may comprise, for example, magnetoresistive or magnetic RAM (MRAM), which has certain power consumption advantages over DRAM. The NVRAM 122 may consume significantly less power than DRAM, or even zero power, during standby modes and, because it is non-volatile, does not require power-consuming auto-refresh and/or self-refresh operations.

The system 100 may be implemented in any computing device, including a personal computer, a workstation, a server, a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices. As illustrated in the embodiment of FIG. 1, the system 100 comprises the SoC 102 electrically coupled to the DRAM 104, the NVRAM 122, and a nonvolatile block memory 130. The nonvolatile block memory 130 may comprise any non-volatile memory, such as, for example, flash memory, flash drive, a Secure Digital (SD) card, a solid-state drive (SSD), or other types.

The SoC 102 comprises various on-chip components, including a central processing unit (CPU) 106, a DRAM controller 108, static random access memory (SRAM) 110, read only memory (ROM) 112, a NVRAM controller 118, and a storage controller 114 interconnected via a SoC bus 116. The SoC 102 may include one or more memory clients that request memory resources from the heterogeneous system memory (DRAM 104 and NVRAM 122). The memory clients may comprise one or more processing units (e.g., central processing unit (CPU) 106, a graphics processing unit (GPU), a digital signal processor (DSP), etc.), a video encoder, or other clients requesting read/write access to the heterogeneous system memory.

Storage controller 114 on SoC 102 is electrically coupled to nonvolatile block memory 130. Storage controller 114 manages the data stored on nonvolatile block memory 130. DRAM controller 108 is electrically coupled to DRAM 104 via, for example, a RAM bus. DRAM controller 108 manages the flow of data going to and from the DRAM 104. DRAM controller 108 generally comprises the logic for reading and writing to DRAM 104. NVRAM controller 118 manages the flow of data going to and from the NVRAM 122. NVRAM controller generally comprises the logic for reading and writing to NVRAM 122.

The DRAM 104 may comprise an error correcting code (ECC) module 124 and a cell array 126. ECC module 124 is configured to detect and correct single-bit or double-bit errors during DRAM operations (e.g., read and/or write operations). For example, during a DRAM write operation, the ECC module 124 may use the write data as input and then generate redundant parity check bits. The combined write data and parity check bits together form a unit known as a codeword and may be stored either separated or together in the DRAM cell array 126. During a read operation, the ECC module 124 may use the retrieved data portion of the codeword to recompute the parity check bits and then compare these against the parity check bits portion of the codeword that was stored during the write operation. A mismatch between the read recomputed parity and the stored parity indicates a detected error. In addition, the parity check bits may be sufficient to provide single error correction within the codeword.

As illustrated in FIG. 1, an operating system (O/S 120) executed by the CPU 106 may comprise various modules for optimizing memory power consumption of the heterogeneous system memory. A power optimization heterogeneous memory manager 132 may comprise a kernel memory manager 134 and initialization module(s) 136. The memory manager 132 and the initialization module(s) 136 generally comprise the logic for initializing and configuring the hybrid or heterogeneous system memory comprising the NVRAM 122 and the DRAM 104.

In operation (e.g., during boot of the system 100), the CPU 106 may discover that both the DRAM 104 and the NVRAM 122 are coupled to the SoC 102. The initialization module(s) 136 may discover and communicate different characteristics of each type of memory to the O/S 120. Based on the memory characteristics, the system 100 may assign specific types of memory requests or purposes to each type of memory to conserve power consumption. It should be appreciated that the NVRAM 122 may consume relatively higher power than VRAM during memory write operation, but it may consume zero power for data retention. Therefore, NRAM 122 may be used for mostly read data or data that is accessed relatively infrequently. In an embodiment, the NVRAM 122 may be purposed for read-only operations, kernel page tables, and a read-write block device for memory swap operations. The DRAM 104 may be purposed for zero-initialized operations, such as, for example, a program data heap, and a program stack for read-write data operations. It should be appreciated that these assignments may be based on the power consumption characteristics of the NVRAM 122 and the DRAM 104. In operation, the kernel memory manager 134 is aware of both types of memory and makes allocations based on the assigned purposes for each type.

Figure 2:
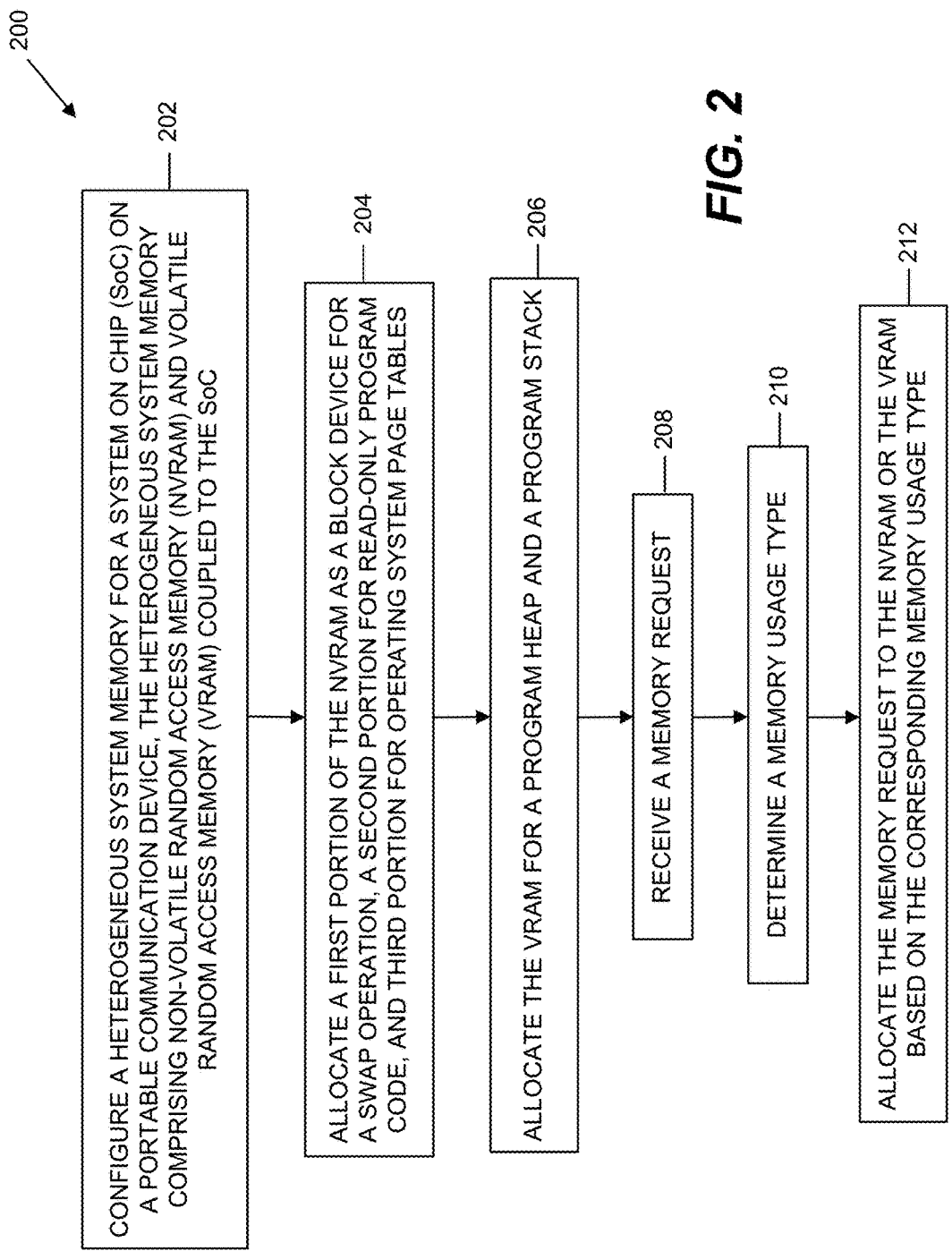
FIG. 2 is a flowchart illustrating an embodiment of a method implemented in the system of FIG. 1 for optimizing memory power consumption of the heterogeneous system memory.

FIG. 2 illustrates an embodiment of a method 200 for optimizing memory power consumption in the system 100. At block 202, the system 100 configures a heterogeneous system memory comprising the NVRAM 122 and the DRAM 104. It should be appreciated that the heterogeneous system memory may be configured at system and hardware platform design time. At block 204, the system 100 allocates the NVRAM 122 for certain memory operations or types of memory requests that may consume less power than if otherwise performed by the DRAM 104. For example, in an embodiment, a first portion of the NVRAM 122 may be allocated as a block device for a swap operation, a second portion for program code and read-only data, and a third portion for page tables associated with the O/S 120. IT should be appreciated that while the NVRAM 122 may consume relatively more power than the DRAM 104 for read operations, it does not consume refresh and self-refresh power and, therefore, overall power consumption may be reduced in situations where NVRAM 122 is used as read-only memory. Furthermore, NVRAM bank activation may be improved relative to the DRAM 104. Because NVRAM write power may be significantly higher than for the DRAM 104, the DRAM 104 may be used for read/write buffers rather the NVRAM 122. However, certain types of infrequent writes (e.g., swap and/or file cache) may be performed by the NVRAM 122 with reasonable power consumption and much faster than conventional nonvolatile block memory. At block 206, the system 100 may allocate the DRAM 104 for appropriate memory usage(s) or memory request types, such as, for example, a program data heap and a program stack. Blocks 204 and 206 may be executed at a platform characterization and/or a power optimization stage of the product life cycle.

In operation, the system 100 receives memory requests from memory clients. For each memory request, at block 210, the system 100 may determine a memory usage type as assigned in the manner described above. At block 212, the system 100 allocates the memory request to the NVRAM 122 or the DRAM 104 based on the corresponding memory usage type. It should be appreciated that the assignment and allocation of memory usage and memory request types to the respective memory types may vary.

Figure 3:
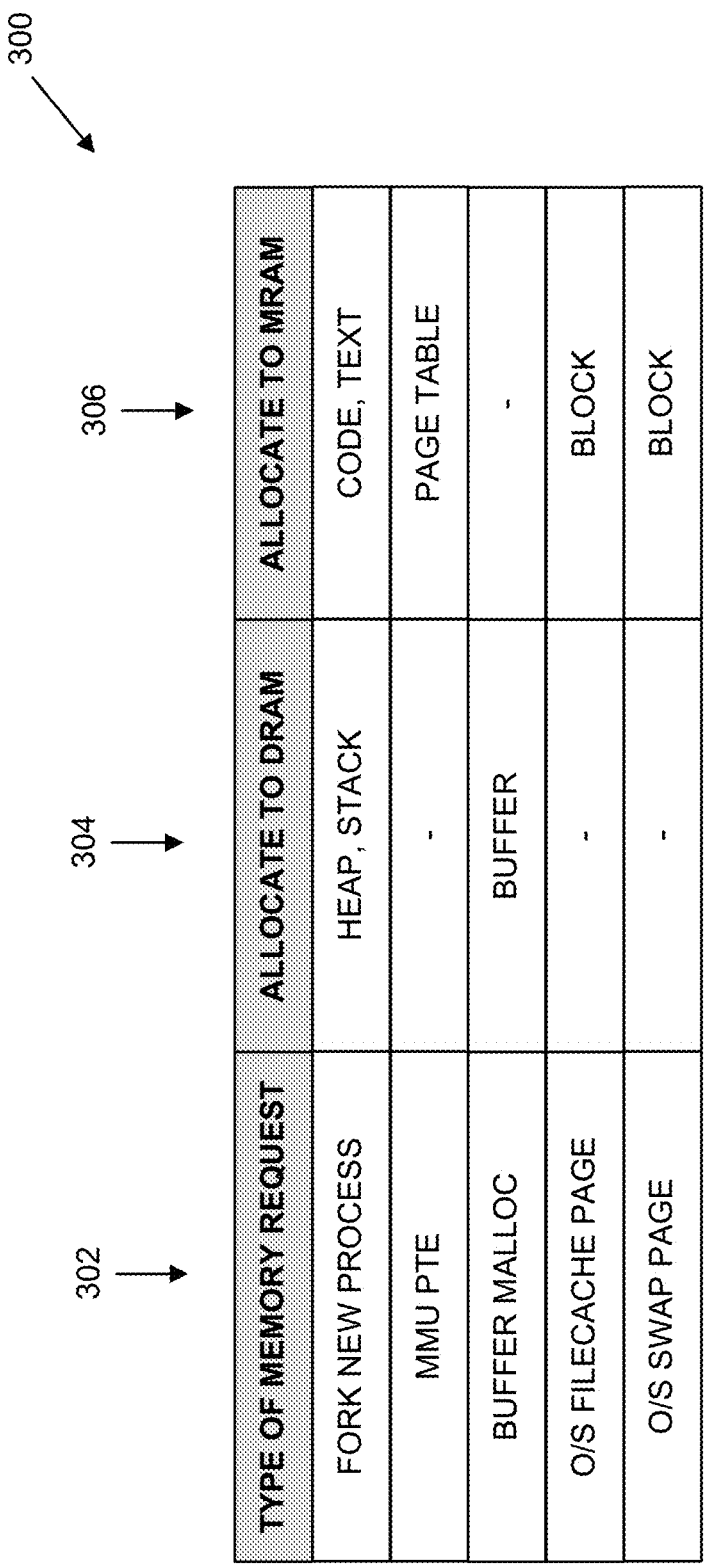
FIG. 3 is a table illustrating the allocation of various exemplary memory request types to a dynamic random access memory (DRAM) and a magnetoresistive random access memory (MRAM) comprising a heterogeneous system memory.

FIG. 3 is a table 300 illustrating the allocation of various exemplary memory request types to the DRAM 104 and the NVRAM 122. Column 302 identifies various types of memory requests, and columns 304 and 306 indicate the corresponding allocation to the DRAM 104 and the NVRAM 122, respectively. As illustrated in FIG. 3, if a memory request involves forking a new process, heap and stack memory may be allocated to the DRAM 104 while code and text memory may be allocated to the NVRAM 122. A memory request involving a page table entry (PTE) from a memory management unit (MMU) may be allocated to the NVRAM 122. Buffer memory allocations may be allocated to the DRAM 104 because, for example, the data buffers generally incur frequent read and write access, which may consume more power if allocated in NVRAM 122. Memory requests involving O/S file cache and swap operations may be allocated to a block device in the NVRAM 122 because, for example, the swapped page and file cache is not expected to be accessed anytime soon, and allocating these onto NVRAM 122 would save the refresh power if the allocation is towards VRAM.

Figure 4:
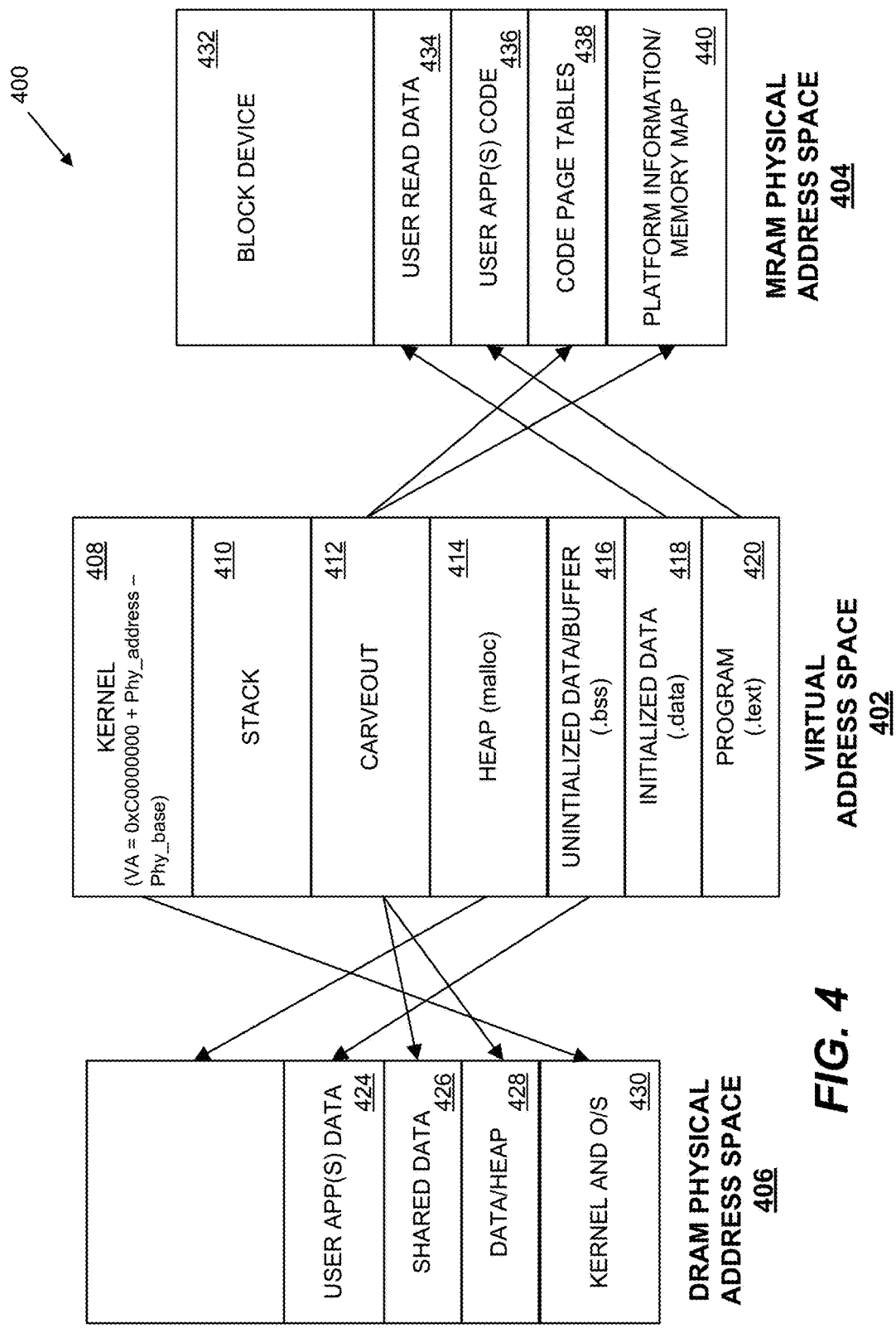
FIG. 4 is an exemplary embodiment of a memory map for translating a virtual address space to physical address spaces of the DRAM and MRAM.

FIG. 4 is an exemplary embodiment of a memory map 400 for translating a virtual address space 402 of the system 100 to physical address spaces 404 and 404 of the DRAM 104 and MRAM 122, respectively. The virtual address space 402 comprises portions for each of the following: kernel 408, stack 410, memory carve out 412 which may be reserved as unusable to the HLOS, program heap 414, data buffer 416 for uninitialized data, and programs 420. The arrows in FIG. 4 illustrate which portions of the virtual address space 402 are allocated to the DRAM physical address space 406 and the MRAM physical address space 404. The DRAM physical address space 406 may comprise user applications data 424, shared data 426, data/heap 428 for the execution by processor unit such as a GPU and a DSP, and kernel and O/S 430. The MRAM physical address space 404 may comprise a block device 432 used for swap operations, user read data 434, user applications code 436, code page tables 438, and platform information and memory map 440, which mainly stores the information about the hardware platform and software build, to be used for system discovery, and information sharing within the system.

Figure 5:
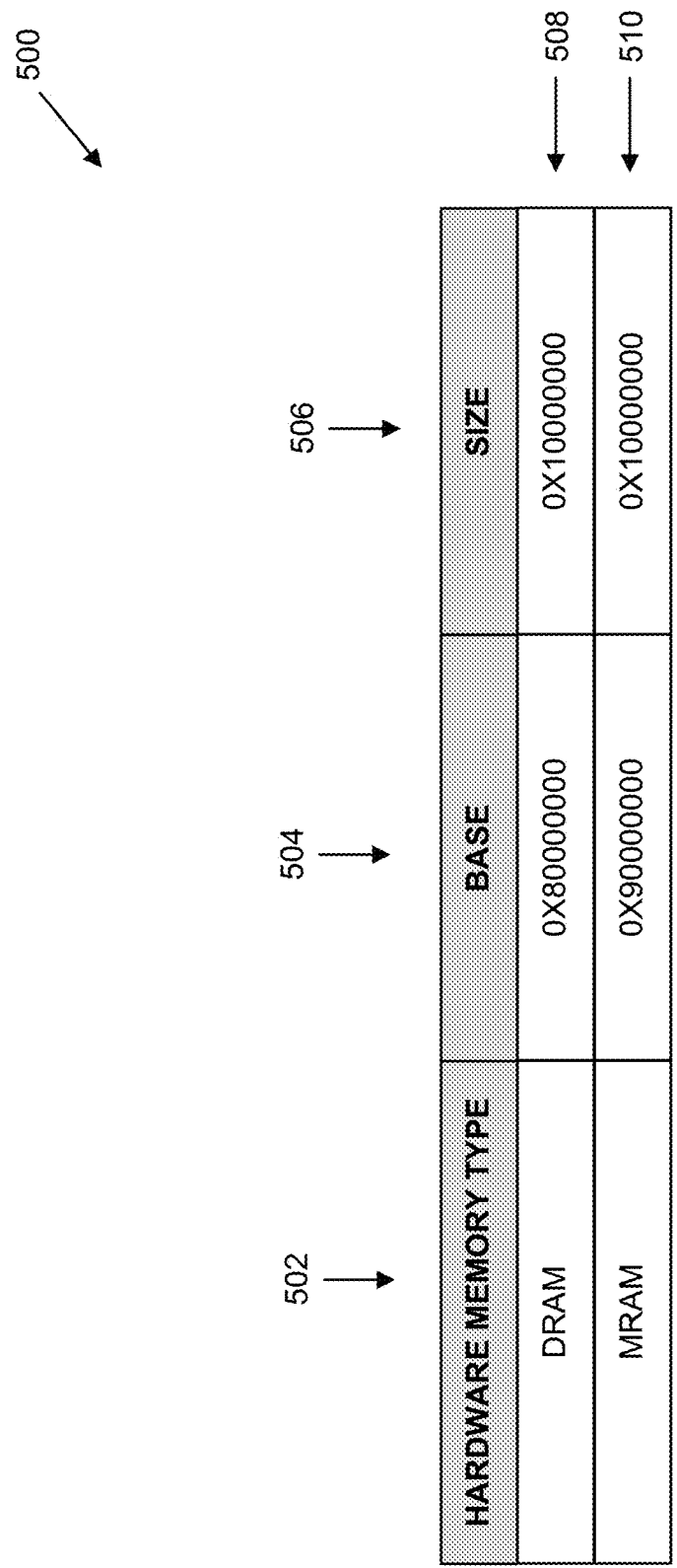
FIG. 5 is an embodiment of a data structure for storing initialization information for the memory types comprising the heterogeneous system memory.

FIG. 5 is an embodiment of a data structure 500 for storing initialization information for the memory types comprising the heterogeneous system memory. This can be part of the platform information and memory map 440 in FIG. 4. For memory types 508 and 510 (DRAM 104 and MRAM 122, respectively), the data structure 500 may store various memory characteristics, including, base (column 504) and size (column 506). FIG. 6 is an embodiment of a data structure 600 for storing system memory characteristics for a software memory partition. This can be part of the platform information and memory map 440 in FIG. 4. Column 602 identifies various software memory partitions, including, for example, the kernel, DRAM memory carve out, MRAM carve out, and swap partition. The data structure 600 may define various platform parameters, such as, a base 604 to indicate the start address of the software memory partition and a size 606 to indicate the total size of the software memory partition. It should be appreciated that, within a software memory partition, multiple software images may be registered as a legal/allowed resident of the memory partition. The software memory partition may list the allowed software images by providing an allowed image field 608, which is the ID of the software image, a valid variable 610 to indicate if the allowed image has been initialized and allocated memory in the partition, a base 612 to indicate, if the valid variable 610 is set, the start address of the memory allocated to the image, and a size 614 to indicate, if the valid variable 610 is set, the size of the memory allocated to the image. It should be appreciated that an operating system vendor or an original equipment manufacturer may program the data structures 500 and 600 in the system 100. In an embodiment, the data fields 602, 604, 606, and 608 may be provisioned in the factory, while data fields 610, 612, and 614 may be programmed at runtime.

In an embodiment, the MRAM 122 may be dynamically used for read only objects by creating and managing separate memory pool zones 706. The kernel memory manager 134 may create a zone_normal 712 and a zone_highmem 710 located in the DRAM physical memory 704, as well as a zone_read 708 located in the MRAM physical memory 702. The zone_read 708 comprises a memory pool zone specifically configured for dynamically allocating read-only objects. When loading user applications, depending on the user program's header indication, the O/S 120 may load the executable code and read-only data into zone_read 708 and the writeable data into zone_normal 712 or zone_highmem 710. For dynamic requested buffers during runtime, the O/S 120 may allocate the buffer from zone_normal 712 and zone_highmem 710, except if the application indicates a preference for zone_read 708. A fallback mechanism may be incorporated to support the case in which the system 100 runs out of desired memory type.

FIG. 8 is a table 800 illustrating exemplary program header flags 802 for packaging a program image in the nonvolatile block memory 130. In the embodiment of FIG. 8, the program header flags 802 may be used for the Executable and Linkable Format (ELF), which is a common standard file format for executables, object code, shared libraries, and core dumps. Each program header 802 has a corresponding value 804 and defines a predefined memory usage purpose 806. The program header flags 802 indicate the type of content in the segment (e.g., executable code, read/writeable data, or read-only data). Each flag may be assigned a value 804 defined by a standard. As illustrated in FIG. 8, a PF_X flag may have a value of "1" for programmatically indicating that the corresponding segment of a program image may be executed. A PF_W flag may have a value of "2" for programmatically indicating that the corresponding segment may be written to, and the PF_R flag may have a value of "4" for programmatically indicating that the corresponding segment may be read. A PF_MASKPROC flag may have a hex value "0xf0000000", which is reserved for processor-specific purposes. The use of the program header flags 802 during exemplary program loading and/or initialization methods are described below with reference to FIGS. 9-11.

Figure 9:
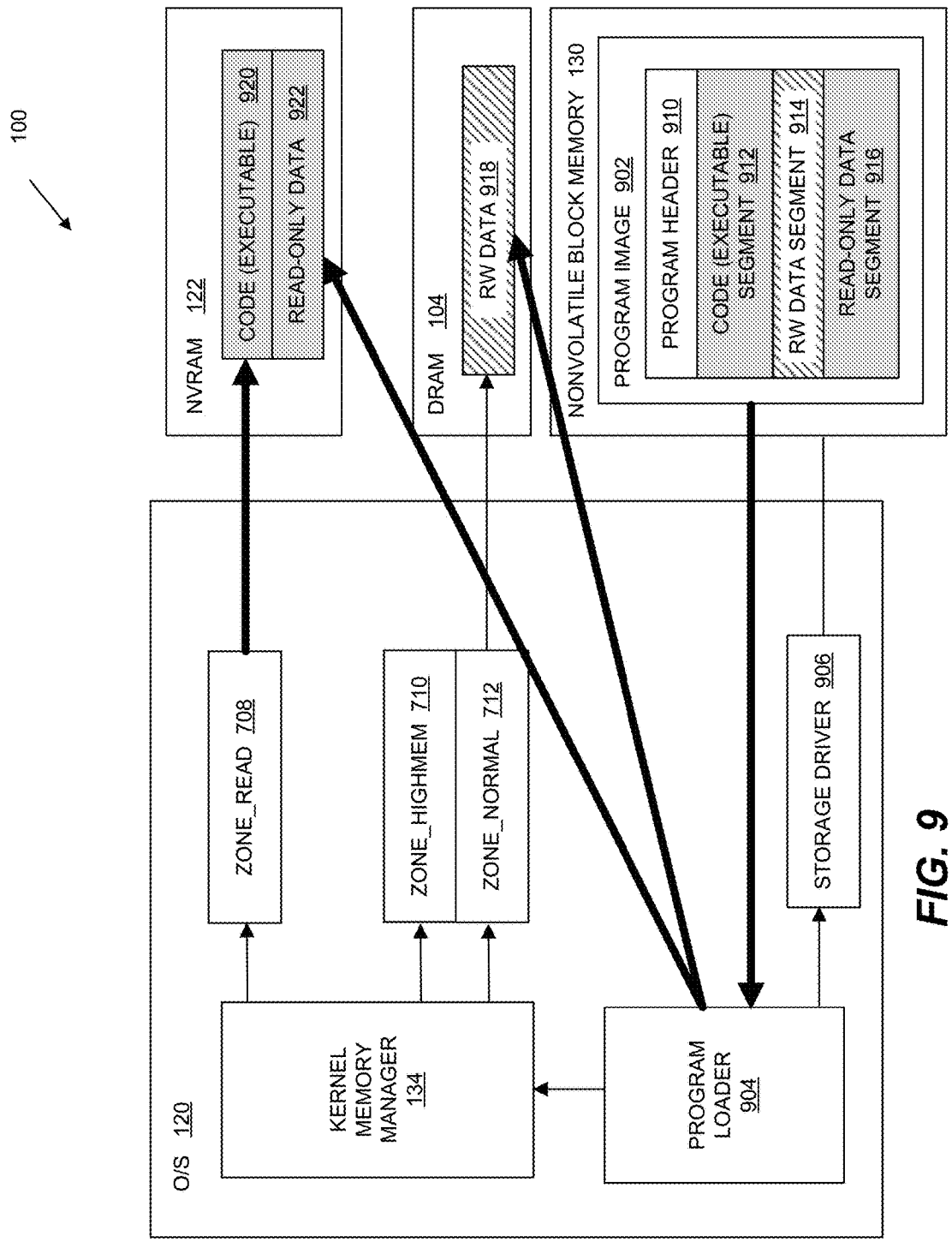
FIG. 9 is a functional block diagram illustrating an embodiment of a method for program loading in the system of FIG. 1.

FIG. 9 is a functional block diagram illustrating an embodiment of a method for program loading in the system 100. The nonvolatile block memory 130 may store a plurality of program images 902. A program image 902 may comprise a plurality of code segments and a program header 910 indicating the type of content in the program image. A segment may be an executable code segment 912, a read/write data segment 914, and/or a read-only data segment 916. The O/S 120 may further comprise a storage driver 906 and a program loader 904. The program loader 904 communicates with the kernel memory manager 134 and a storage driver 906 associated with the storage controller 114, which controls communication with the nonvolatile block memory 130.

Figure 7:
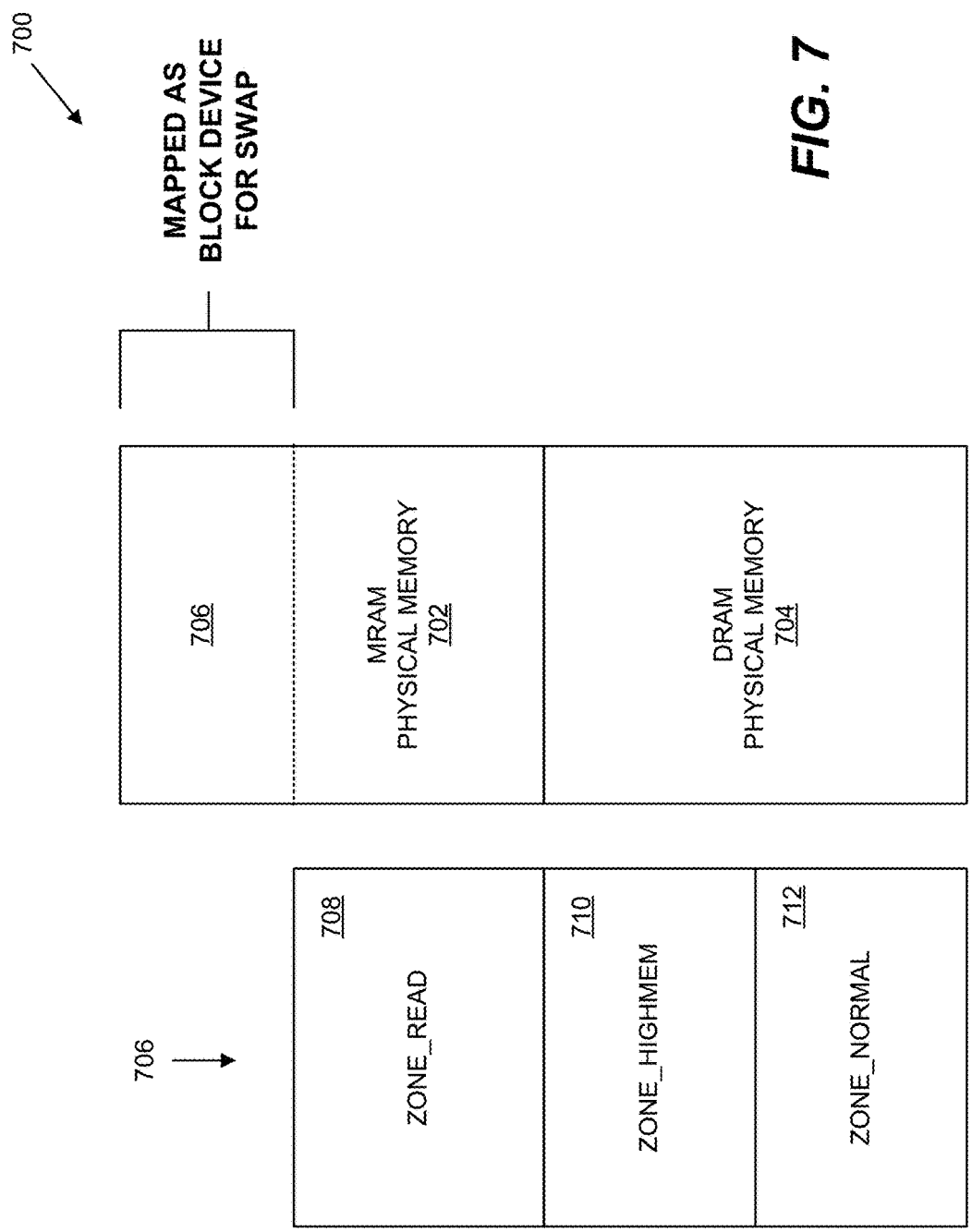
FIG. 7 illustrates various operating system zones mapped to the physical address spaces of the DRAM and MRAM.
Figure 10:
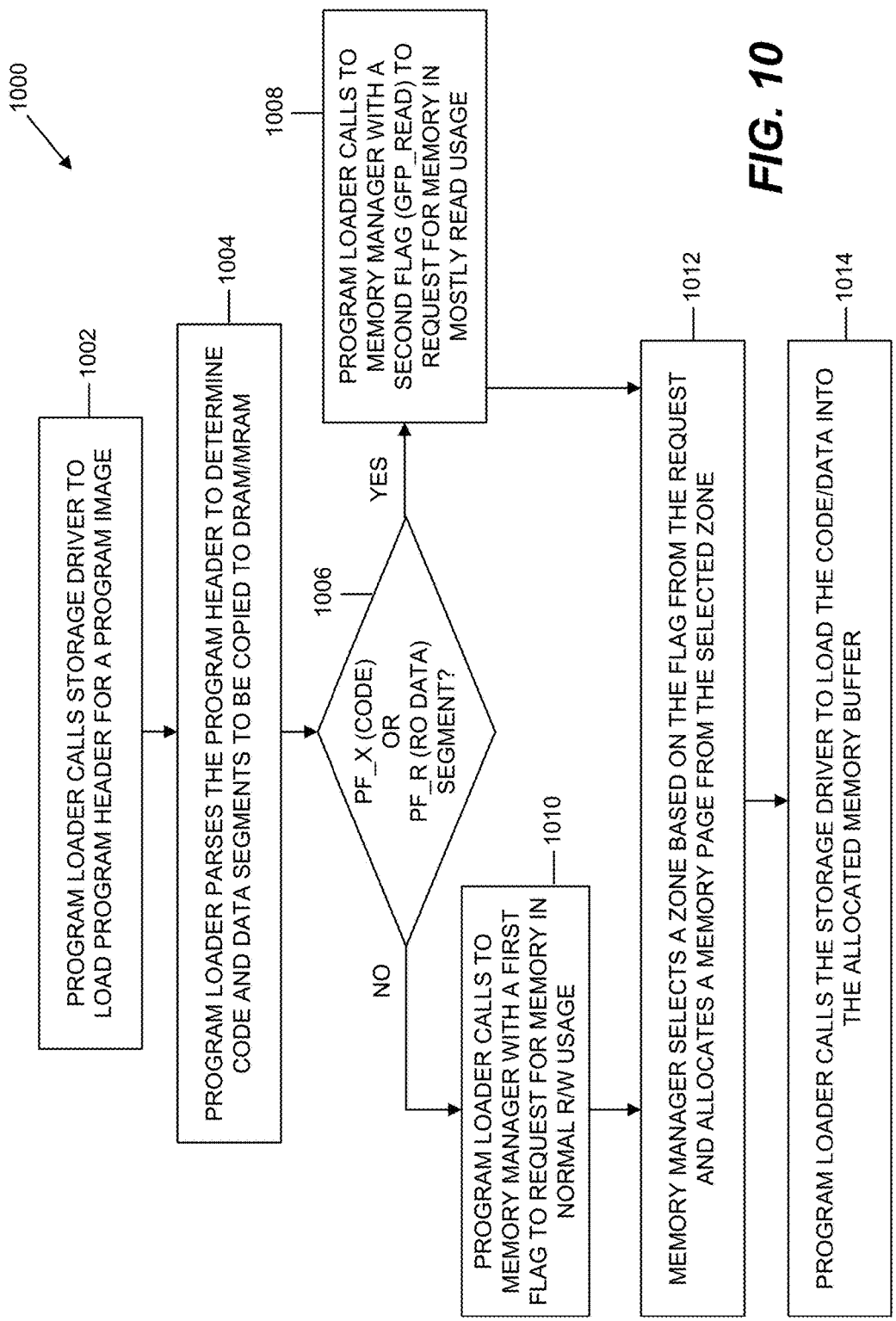
FIG. 10 is a flowchart illustrating an embodiment of a method for loading a program image from the nonvolatile block memory to the heterogeneous system memory.

As illustrated in FIG. 10, the program loader 904 may control a method for loading a program image 902 from the nonvolatile block memory 130 to the heterogeneous system memory using the memory pool zones 708, 710, and 712 (FIG. 7). At block 1002, the program loader 904 calls the storage driver 906 to load a program header 910 for a program image 902 stored in the nonvolatile block memory 130. At block 1004, the program loader 904 parses the program header 910 to determine the code and/or data segments to be copied to the DRAM 104 or the NVRAM 122. At decision block 1006, if the program header 910 comprises a PF_X flag (code) or a PF_R flag (read-only data), the program loader 904 calls to the kernel memory manager 134 to request memory in mostly read usage (block 1008). The call to the kernel memory manager 134 may comprise a get free page read (GFP_READ) flag. If the program header 910 does not comprises a PF_X flag (code) or a PF_R flag (read-only data), the program loader 904 calls to the kernel memory manager 134 with another flag to request memory in normal read/write usage. At block 1012, the kernel memory manager 134 selects one of the zones 708, 710, or 712 based on the flag from the request, and allocates a memory page from the selected zone. At block 1014, the program loader 904 calls the storage driver 906 to load the code and data into the allocated memory buffer. As illustrated in the embodiment of FIG. 9, the read-write data 918 from the program image 902 may be allocated to the DRAM 104 using the zones 710 and/or 712. The executable code 920 and the read-only data 922 may be allocated to the NVRAM 122 using the zone 708. It should be appreciated that a fallback mechanism may be incorporated to support the case in which the system 100 runs out of desired memory type. In this manner, under high memory request pressure, the kernel may, for example, allocate read-write data to NVRAM 122 when running out of VRAM type.

Figure 11:
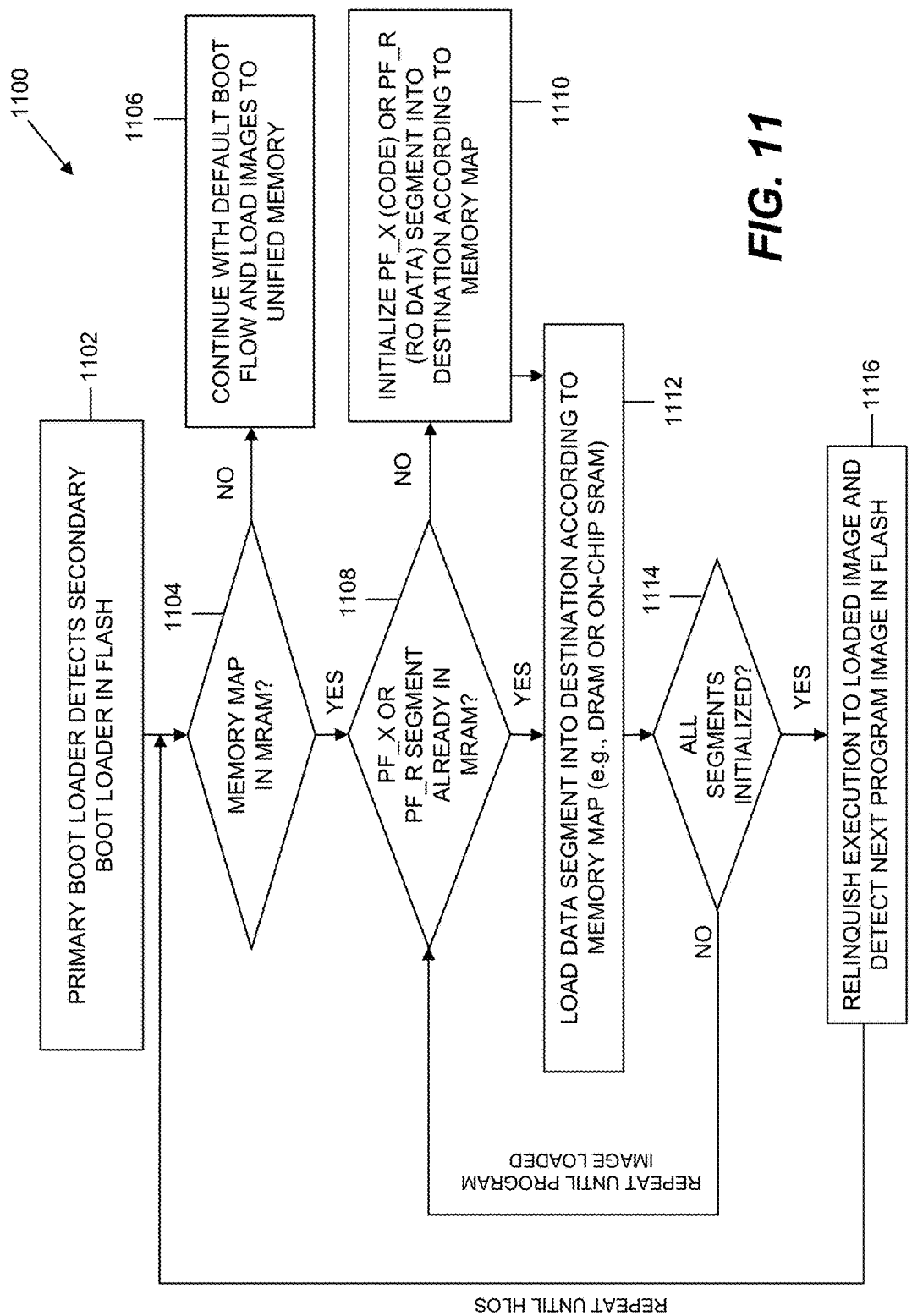
FIG. 11 is a flowchart illustrating an embodiment of a method for initializing the heterogeneous system memory of FIG. 1.

FIG. 11 is a flowchart illustrating an embodiment of a method 1100 for initializing the heterogeneous system memory. It should be appreciated that the method 1100 may advantageously implement the NVRAM 122 for a warm boot operation, which makes use of the boot stage code and data that reside in the NVRAM 122, by passing the step to load the needed code and data from Flash storage. A warm boot operation may occur significantly faster than conventional methods using nonvolatile block memory 130. At block 1102, a primary boot loader may detect a secondary boot loader in flash memory 130. At decision block 1104, the primary boot loader determines whether there is a memory map in the NVRAM 122. If a memory map is not detected in a NVRAM 122, at block 1106, the process may continue with a default boot flow and load program images to a unified system memory rather than a heterogeneous system memory. If a memory map is detected in a NVRAM 122, the boot loader proceeds to validate code segments in the program image(s) 902, and initialize the data and zero-initialized (ZI) segments in RAM. If the memory for the secondary boot loader is reclaimed by a runtime image, the primary boot loader may load the second boot loader from the nonvolatile block memory 130 upon each boot. The secondary boot loader initializes the DRAM 104, and repeats for each boot chain image and boot up to the O/S 120.

Referring to FIG. 11, at decision block 1108, the boot loader may read from the NVRAM 122 to check whether any PF_X or PF_R segments are already in the NVRAM 122. If not, the PF_X (code) or PF_R (read-only data) segments may be initialized into a destination according to the memory map (block 1110), and then the operation may proceed to block 1112. If PF_X or PF_R segments are already in the NVRAM 122, then block 1110 may be bypassed, and the operation may jump directly to block 1112, in which the data segments may be loaded into the destination according to the memory map (e.g., DRAM 104, on-chip SRAM 110). If there are additional segments in the current program image, flow may return to decision block 1108 to repeat until the entire image has been loaded. If all segments in a program image 902 have been initialized (decision block 1114), the CPU may relinquish its execution to the loaded image (block 1116). In the example of the PBL loading the SBL, the execution may transition from PBL to SBL image. The loaded image is then executed and the method detects a next program image 902 (block 1116) by repeating steps 1104 through step 1116, until the CPU execution reaches HLOS kernel and user space, and completes the system booting process.

Figure 12:
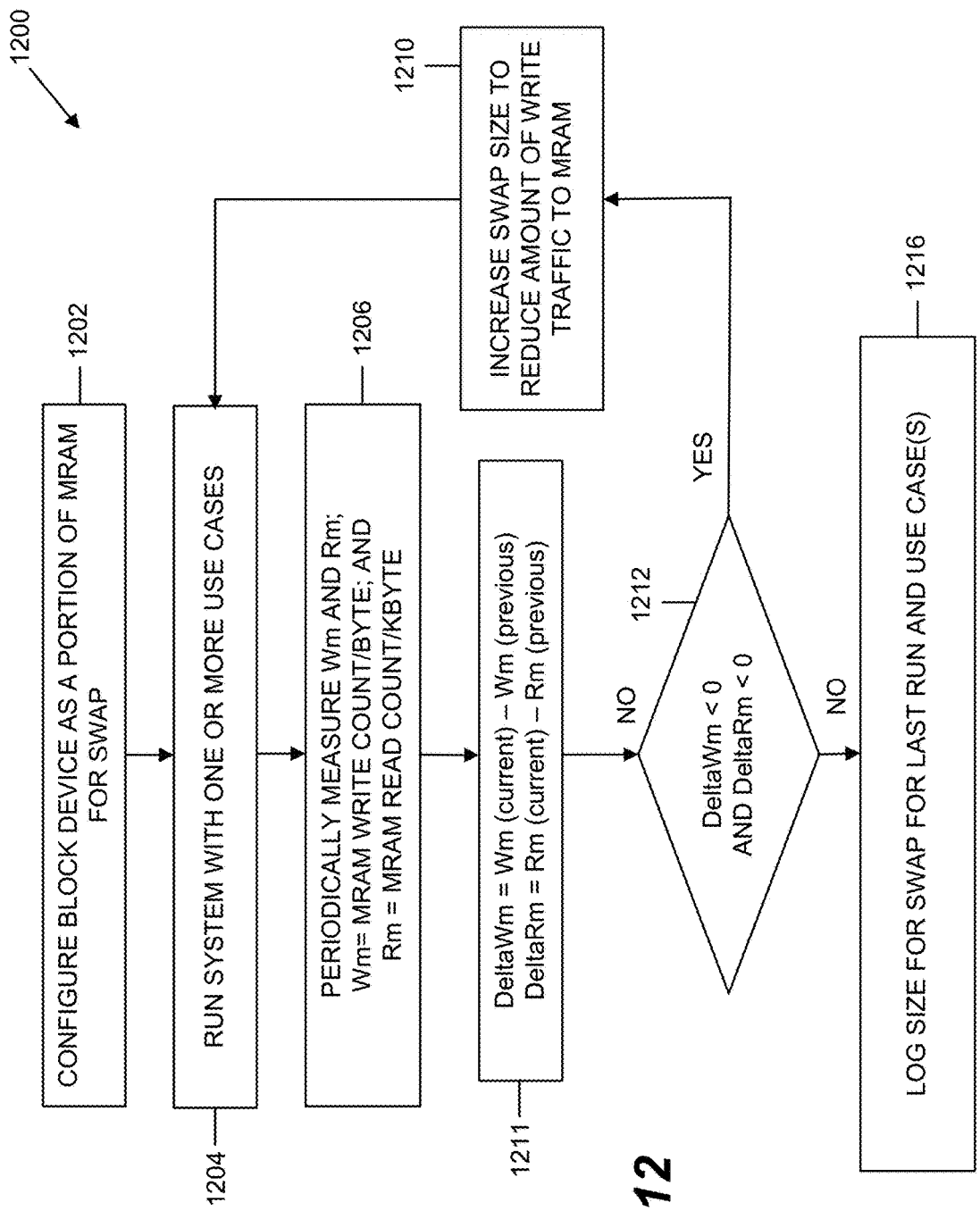
FIG. 12 is a flowchart illustrating an embodiment of a method for calibrating the size of the block device allocated to the nonvolatile random access memory (NVRAM) in the heterogeneous system memory of FIG. 1.

The system 100 may be configured to calibrate the size of the block device 432 (FIG. 4) allocated to the NVRAM 122. FIG. 12 illustrates an embodiment of a calibration method 1200. It should be appreciated that the calibration may be unique for each platform based on, for example, memory size, software build, etc. In general, the calibration uses a hardware traffic monitor to record the number of read and write accesses to the DRAM 104 and the NVRAM 122 under one or more use cases. FIG. 13 is a traffic calibration table 1300 illustrating exemplary use cases 1302 involving different system operations (e.g., running a game with music, a streaming video download, multiple instances of video playback, and video recording). Each use case may define a swap partition size 1304, a HLOS reading area size 1306, and a peripheral image size 1308. It should be appreciated that different use case may have different size requirements for different memory types. For example, in one use case, a video playback with multiple windows open may require more read-write data buffer in VRAM, and therefore need to have more swap area to free up the memory in VRAM from background processes and low priority tasks that do not access the memory frequently. As a result of calibration, this use case may show higher swap partition size in NVRAM 122 than other use cases.

Referring to FIG. 12, at block 1202, the block device 432 may be initially configured as zero percent of the NVRAM 122. At block 1204, the system 100 may run one or more use cases 1302. The system 100 may periodically measure, for example, an average write count/kbyte (Wm) and a read count/kbyte (Rm) associated with the NVRAM 122 over a time period (e.g., 10 seconds). The system 100 may increase the swap size (block 1210) to reduce the amount of traffic to the NVRAM 122. By doing this, some background processes and other less frequent access pages in the VRAM may be pushed to the swap partition in NVRAM 122, and free up the space for read-write data allocation, which otherwise could be allocated into NVRAM 122 under a high memory pressure. The system 100 may then return flow to block 1204 to run the same use case and measure Wm and Rm again (block 1026). The system 100 may proceed to decision blocks 1211 and 1212 to determine whether an increase in swap size causes the traffic to NVRAM 122 to be less frequent, by checking if both DeltaWm<0 and DeltaRm<0. If "yes", the system 100 may continue to increase the swap (block 1210), and then return flow to block 1204 for another run to check the Wm and Rm again. If the decision block 1212 goes to "No" it means that the swap size of last run was the most optimal configuration for this use case, and the system 1000 may then terminate the calibration sequence for this use case, proceed to block 1216, where the system 100 may log the size for the block device 432 and the HLOS for the use cases 1302.

Figure 14:
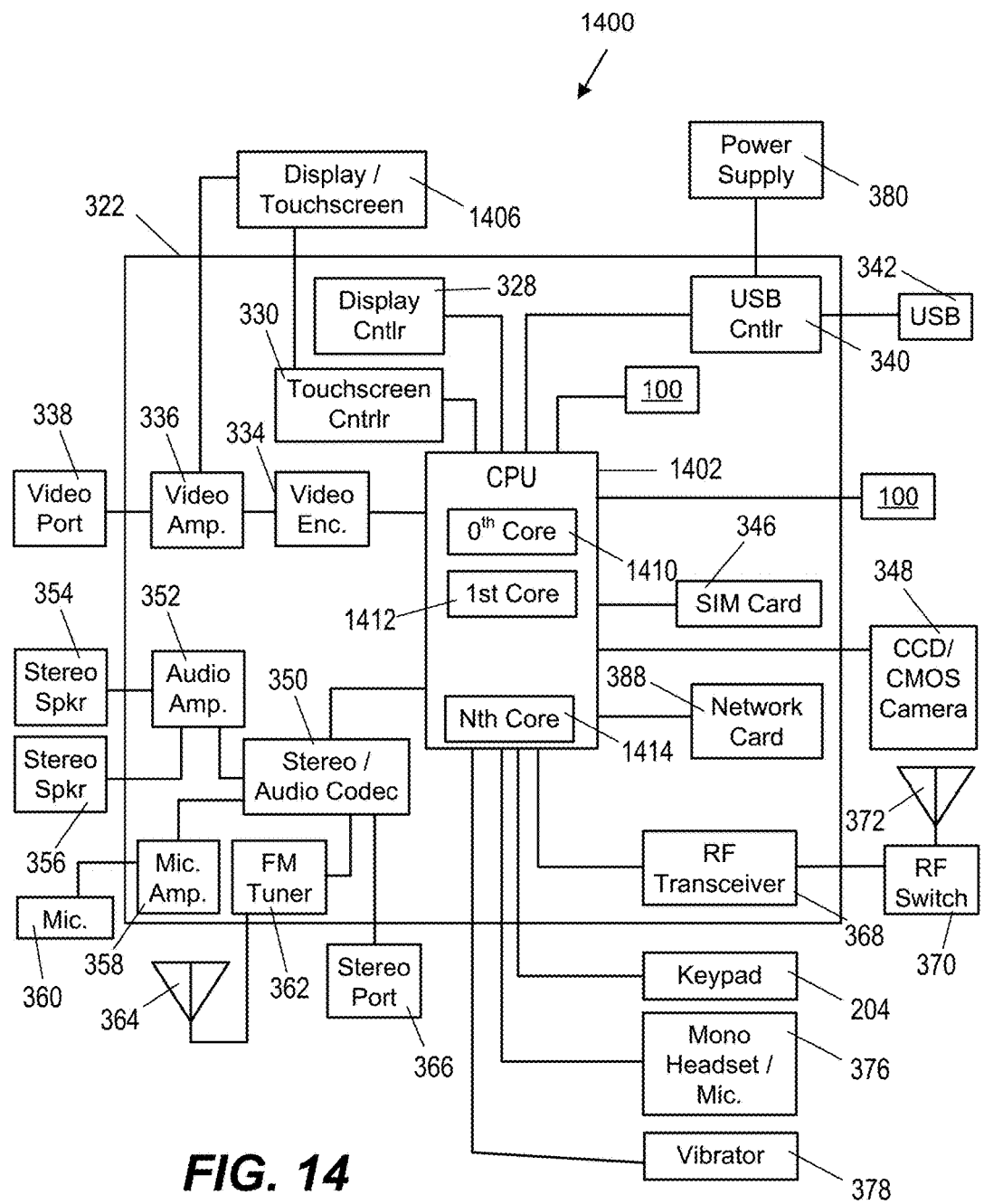
FIG. 14 is a block diagram of an embodiment of a portable communication device for incorporating the system of FIG. 1.

As mentioned above, the system 100 may be incorporated into any desirable computing system. FIG. 14 illustrates the system 100 incorporated in an exemplary portable computing device (PCD) 1400. It will be readily appreciated that certain components of the system 100 are included on the SoC 322 (FIG. 14) while other components (e.g., the DRAM 104, the NVRAM 122, and the nonvolatile block memory 130) are external components coupled to the SoC 322. The SoC 322 may include a multicore CPU 1402. The multicore CPU 1402 may include a zeroth core 1410, a first core 1412, and an Nth core 1414. One of the cores may comprise, for example, a graphics processing unit (GPU) with one or more of the others comprising the CPU.

A display controller 328 and a touch screen controller 330 may be coupled to the CPU 1402. In turn, the touch screen display 1406 external to the on-chip system 322 may be coupled to the display controller 328 and the touch screen controller 330.

FIG. 14 further shows that a video encoder 334, e.g., a phase alternating line (PAL) encoder, a sequential color a memoire (SECAM) encoder, or a national television system(s) committee (NTSC) encoder, is coupled to the multicore CPU 1402. Further, a video amplifier 336 is coupled to the video encoder 334 and the touch screen display 1406. Also, a video port 338 is coupled to the video amplifier 336. As shown in FIG. 14, a universal serial bus (USB) controller 340 is coupled to the multicore CPU 1402. Also, a USB port 342 is coupled to the USB controller 340. Memory 104, 122, and 130 may be coupled to the SoC 322 (as illustrated in FIG. 1).

Further, as shown in FIG. 14, a digital camera 348 may be coupled to the multicore CPU 802. In an exemplary aspect, the digital camera 348 is a charge-coupled device (CCD) camera or a complementary metal-oxide semiconductor (CMOS) camera.

As further illustrated in FIG. 14, a stereo audio coder-decoder (CODEC) 350 may be coupled to the multicore CPU 1402. Moreover, an audio amplifier 352 may coupled to the stereo audio CODEC 350. In an exemplary aspect, a first stereo speaker 354 and a second stereo speaker 356 are coupled to the audio amplifier 352. FIG. 14 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 14 further illustrates that a radio frequency (RF) transceiver 368 may be coupled to the multicore CPU 1402. An RF switch 370 may be coupled to the RF transceiver 368 and an RF antenna 372. A keypad 204 may be coupled to the multicore CPU 1402. Also, a mono headset with a microphone 376 may be coupled to the multicore CPU 1402. Further, a vibrator device 378 may be coupled to the multicore CPU 1402.

FIG. 14 also shows that a power supply 380 may be coupled to the on-chip system 322. In a particular aspect, the power supply 380 is a direct current (DC) power supply that provides power to the various components of the PCD 1400 that require power. Further, in a particular aspect, the power supply is a rechargeable DC battery or a DC power supply that is derived from an alternating current (AC) to DC transformer that is connected to an AC power source.

FIG. 14 further indicates that the PCD 1400 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 14, the touch screen display 1406, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for optimizing memory power consumption in a portable communication device, the method comprising:
determining during a boot operation whether a system memory is heterogeneous in a system on chip (SoC) on the portable communication device, wherein determining the system memory is heterogeneous comprises determining that both non-volatile random access memory (NVRAM) and volatile random access memory (VRAM) are coupled to the SoC, the boot operation including warm booting using boot stage software for detecting a memory map in the NVRAM, the memory map indicating a partition between the VRAM and the NVRAM, detection of the partition between the VRAM and the NVRAM indicating the system memory is heterogeneous;
if the system memory is determined to be heterogeneous, allocating a first portion of the NVRAM as a block device for a swap operation, a second portion of the NVRAM for read-only program code, and a third portion of the NVRAM for operating system page tables, wherein allocating the first portion of the NVRAM as the block device for the swap operation comprises calibrating a size of the block device by periodically measuring an average write count and an average read count associated with the NVRAM;
if the system memory is determined to be heterogeneous, allocating the VRAM for a program heap and a program stack; and
if the system memory is determined to be not heterogeneous, loading program images to a unified system memory and not to heterogeneous system memory.

2. The method of claim 1, wherein the VRAM comprises dynamic random access memory (DRAM), and the NVRAM comprises magnetic random access memory (MRAM).

3. The method of claim 1, further comprising:
receiving a memory request from an application;
determining a memory usage type associated with the memory request; and
allocating to the NVRAM or the VRAM based on the memory usage type.

4. The method of claim 3, wherein the memory usage type corresponds to one of the swap operation, the read-only program code, the operating system page tables, the program heap, and the program stack.

5. The method of claim 3, wherein the memory request comprises a flag indicating the memory usage type.

6. A system for optimizing memory power consumption in a portable communication device, the system comprising:
means for determining during a boot operation whether a system memory is heterogeneous in a system on chip (SoC) on the portable communication device, wherein determining the system memory is heterogeneous comprises determining that both non-volatile random access memory (NVRAM) and volatile random access memory (VRAM) are coupled to the SoC, the means for determining during the boot operation including means for determining during a warm boot operation whether the system memory is heterogeneous using boot stage software for detecting a memory map in the NVRAM, the memory map indicating a partition between the VRAM and the NVRAM, detection of the partition between the VRAM and the NVRAM indicating the system memory is heterogeneous;

means for, if the system memory is determined to be heterogeneous, allocating a first portion of the NVRAM as a block device for a swap operation, a second portion of the NVRAM for read-only program code, and a third portion of the NVRAM for operating system page tables wherein the means for allocating the first portion of the NVRAM as the block device for the swap operation comprises means for calibrating a size of the block device by periodically measuring an average write count and an average read count associated with the NVRAM;

means for, if the system memory is determined to be heterogeneous, allocating the VRAM for a program heap and a program stack; and means for, if the system memory is determined to be not heterogeneous, the boot operation loading program images to a unified system memory and not to heterogeneous system memory.

7. The system of claim 6, wherein the VRAM comprises dynamic random access memory (DRAM), and the NVRAM comprises magnetic random access memory (MRAM).

8. The system of claim 6, further comprising:
means for receiving a memory request from an application;
means for determining a memory usage type associated with the memory request; and
means for allocating to the NVRAM or the VRAM based on the memory usage type.

9. The system of claim 8, wherein the memory usage type corresponds to one of the swap operation, the read-only program code, the operating system page tables, the program heap, and the program stack.

10. The system of claim 8, wherein the memory request comprises a flag indicating the memory usage type.

11. A computer program embodied in a memory and executable by a processor for optimizing memory power consumption in a portable communication device, the computer program comprising logic configured to:
determine during a boot operation whether a system memory is heterogeneous in a system on chip (SoC) on the portable communication device, wherein determining the system memory is heterogeneous comprises determining that both non-volatile random access memory (NVRAM) and volatile random access memory (VRAM) are coupled to the SoC, the boot operation including warm booting using boot stage software for detecting a memory map in the NVRAM, the memory map indicating a partition between the VRAM and the NVRAM, detection of the partition between the VRAM and the NVRAM indicating the system memory is heterogeneous;
if the system memory is determined to be heterogeneous, allocate a first portion of the NVRAM as a block device for a swap operation, a second portion of the NVRAM for read-only program code, and a third portion of the NVRAM for operating system page tables, wherein allocating the first portion of the NVRAM as the block device for the swap operation comprises calibrating a size of the block device by periodically measuring an average write count and an average read count associated with the NVRAM;
if the system memory is determined to be heterogeneous, allocate the VRAM for a program heap and a program stack; and
if the system memory is determined to be not heterogeneous, load program images to a unified system memory and not to heterogeneous system memory.

12. The computer program of claim 11, wherein the VRAM comprises dynamic random access memory (DRAM), and the NVRAM comprises magnetic random access memory (MRAM).

13. The computer program of claim 11, further comprising logic configured to:
receive a memory request from an application;
determine a memory usage type associated with the memory request; and
allocate to the NVRAM or the VRAM based on the memory usage type.

14. The computer program of claim 13, wherein memory usage type corresponds to one of the swap operation, the read-only program code, the operating system page tables, the program heap, and the program stack.

15. The computer program of claim 13, wherein the memory request comprises a flag indicating the memory usage type.

16. A system for providing a heterogeneous system memory in a portable communication device, the system comprising:
a system on chip (SoC) coupled to a system memory;
the SoC comprising an operating system for determining during a boot operation whether the system memory comprises a combination of nonvolatile random access memory (NVRAM) and volatile random access memory (VRAM) coupled to the SoC, the boot operation including warm booting using boot stage software for detecting a memory map in the NVRAM, the memory map indicating a partition between the VRAM and the NVRAM, detection of the partition between the VRAM and the NVRAM indicating the system memory comprises the combination of the NVRAM and the VRAM, the operating system comprising a memory manager configured to:
if the system memory is determined to comprise the combination of the NVRAM and the VRAM, allocate a first portion of the NVRAM as a block device for a swap operation, a second portion of the NVRAM for read-only program code, and a third portion of the NVRAM for operating system page tables, wherein allocating the first portion of the NVRAM as the block device for the swap operation comprises calibrating a size of the block device by periodically measuring an average write count and an average read count associated with the NVRAM;
if the system memory is determined to comprise the combination of the NVRAM and the VRAM, allocate the VRAM for a program heap and a program stack; and
if the system memory is determined to be not comprised of the combination of the NVRAM and the VRAM, load program images to a unified system memory not comprising the combination of the NVRAM and the VRAM.

17. The system of claim 16, wherein the VRAM comprises dynamic random access memory (DRAM), and the NVRAM comprises magnetic random access memory (MRAM).

18. The system of claim 16, wherein the memory manager is further configured to:
- receive a memory request from an application;
- determine a memory usage type associated with the memory request; and
- allocate to the NVRAM or the VRAM based on the memory usage type.

19. The system of claim 18, wherein the memory usage type corresponds to one of the swap operation, the read-only program code, the operating system page tables, the program heap, and the program stack.

20. The system of claim 18, wherein the memory request comprises a flag indicating the memory usage type.

21. The system of claim 16, wherein the portable communication device comprises one of a smartphone, a tablet computer, and a portable gaming device.

* * * * *